United States Patent
Lenning

(10) Patent No.: US 8,116,948 B2
(45) Date of Patent: Feb. 14, 2012

(54) FORCE LIMITER

(75) Inventor: Anders Lenning, Kungsbacka (SE)

(73) Assignee: Autoliv Development AB, Vargarda (SE)

( * ) Notice: Subject to any disclaimer, the term of this patent is extended or adjusted under 35 U.S.C. 154(b) by 1038 days.

(21) Appl. No.: 11/720,280

(22) PCT Filed: Nov. 28, 2005

(86) PCT No.: PCT/SE2005/001778
§ 371 (c)(1),
(2), (4) Date: Nov. 16, 2007

(87) PCT Pub. No.: WO2006/057614
PCT Pub. Date: Jun. 1, 2006

(65) Prior Publication Data
US 2009/0005935 A1 Jan. 1, 2009

(30) Foreign Application Priority Data
Nov. 26, 2004 (GB) .................................. 0426046.9

(51) Int. Cl.
*G06F 17/00* (2006.01)

(52) U.S. Cl. ........................................................ 701/45

(58) Field of Classification Search .................... 701/36, 701/45; 180/268; 280/801.1, 803, 805, 807
See application file for complete search history.

(56) References Cited

U.S. PATENT DOCUMENTS

| 6,213,510 B1 | 4/2001 | Suyama |
| 2004/0227403 A1 | 11/2004 | Wang |

FOREIGN PATENT DOCUMENTS

| DE | 199 63 580 | 8/2001 |
| EP | 1 022 201 | 7/2000 |
| EP | 1 312 518 | 5/2003 |
| GB | 2 319 502 | 5/1998 |
| GB | 2 386 350 | 9/2003 |
| GB | 2386350 | * 9/2003 |

* cited by examiner

Primary Examiner — Kim T Nguyen
(74) Attorney, Agent, or Firm — Brinks Hofer Gilson & Lione

(57) ABSTRACT

An energy-absorbing force limiter for a safety device comprises a first component (5) and a second component (2), such as a seat-belt, that is moveable relative to the first component (5). The force limiter provides an energy-absorbing movement-resisting effect, for example by means of a frictional brake (4, 5), to resist movement of the second component relative to the first. An adjustable control element (6) actuates the brake. The magnitude of the frictional effect is a function of the degree of adjustment of the control element and at least one parameter, such as temperature, which influences the coefficient of friction. The control mechanism (9) adjusts the adjustable control element (6) to control the magnitude of the movement-resisting effect in response to a signal (12) representative of the desired resistance to movement together with a signal (10, 11) representative of that at least one parameter.

20 Claims, 5 Drawing Sheets

FORCE LIMITER

CROSS REFERENCE TO RELATED APPLICATIONS

This application claims priority to GB patent application number 0426046.9, filed Nov. 26, 2004 and PCT/SE2005/001778, filed Nov.

FIELD OF THE INVENTION

The present invention relates to a force limiter, and more particularly relates to a force limiter in the form an energy-absorbing force limiter for use with, or to be incorporated in, a seat-belt restraint system such as a safety device in a motor vehicle.

BACKGROUND OF THE INVENTION

It has been proposed to use force limiters, and in particular energy-absorbing force limiters, in connection with safety devices provided in motor vehicles such as, for example, seat-belts. The function of a force limiter is to yield, whilst absorbing energy, if the force limiter is subjected to a force in excess of a predetermined threshold. Whilst it is always desirable to ensure that an occupant of a vehicle should not hit any part of the vehicle with a substantial relative speed, it is known that it is undesirable to apply excessive forces to the torso of an occupant through a seat-belt in order to achieve this objective, since the application of high forces may injure the occupant of the vehicle. Thus, the effect of a force limiter is such that when a very substantial acceleration is to be imparted to a vehicle occupant by a seat-belt, the seat-belt will yield slightly, whilst the force limiter absorbs energy, thus minimising the risk of injury arising.

Various types of force-limiting energy-absorber have been proposed previously, including energy-absorbers which rely on the deformation of a metal element. Such arrangements are relatively simple and have a very predictable operating characteristic, but suffer from the disadvantage that it is not easy to vary the level of energy absorbed in response, for example, to the weight of the occupant of the seat or the position of the occupant of the seat immediately before commencement of the accident.

It has also been proposed to provide an adjustable force limiter which incorporates a first component and a second component that is moveable relative to the first component, the force limiter including an arrangement that provides an energy-absorbing movement-resisting effect to resist movement of the second component relative to the first component. GB-A-2,386,350 discloses a force limiter of this type in which friction is used to provide the movement-resisting effect and to absorb energy. In one embodiment, a retractor reel spool moves relative to a housing and a frictional effect can be applied to parts of the spool by expanding a series of piezo-electric plates which form a stack of plates. A control signal is supplied to expand the piezo-electric plates, and thus the frictional force, and the movement-resisting effect, can be controlled. However, the frictional force is not solely determined by the degree of expansion of the piezo-electric plates, but is also dependent upon the temperature of the components which are frictionally engaged, as this can vary the absolute value of the coefficient of friction. In the described arrangement, therefore, a control loop is provided in which a desired value of "belt force" is compared, in a comparator, with a value representing the reel "belt force" which has to be measured. Such a control loop is relatively "slow" and, of course, in a real accident situation, the requirement to absorb energy, in a precisely appropriate manner, can arise very soon after the commencement of the accident, and the duration of the period in which the energy is to be absorbed can, itself, be very short. Thus a "slow" control loop is very undesirable.

The present invention seeks to provide an improved energy absorbing force limiter.

SUMMARY OF THE INVENTION

According to one aspect of this invention there is provided an energy-absorbing force limiter for a safety device comprising a first component and a second component that is moveable relative to the first component, the force limiter including an arrangement that provides an energy-absorbing movement-resisting effect to resist movement of the second component relative to the first component, the arrangement including an adjustable control element, the magnitude of the movement-resisting effect being a function of the specific degree of adjustment of the adjustable control element and the current value of at least one parameter, there being a control mechanism to effect adjustment of the adjustable control element to control the magnitude of the movement-resisting effect in response to a signal representative of the desired resistance to movement together with a signal representative of the at least one parameter.

In one embodiment the movement-resisting effect is a friction effect.

Alternatively the movement-resisting effect is a hydraulic effect.

In a further alternative embodiment the movement-resisting effect is a deformation effect.

If the movement-resisting effect is a friction effect then preferably the arrangement to resist movement of the second component is a brake, the adjustable control element driving a brake element into engagement with a co-operating surface which is, or which moves with, the second component, the control mechanism being responsive to a signal relating to a parameter which effects the coefficient of friction between the brake element and the co-operating surface.

Conveniently the control mechanism is responsive to at least one of a signal relating to the speed of movement of the seat-belt, and a signal relating to the temperature of the brake element.

Alternatively, if the movement-resisting effect is a hydraulic effect then preferably the adjustable control element is a valve that adjusts the resistance to movement of a piston within a cylinder, the control mechanism being responsive to the temperature of hydraulic fluid within the cylinder.

If the movement-resisting effect is a deformation effect then preferably one of the components is associated with one or more elements located to deform part of the other component on movement of the second component relative to the first component, the adjustable control elements serving to adjust to the degree of deformation as the components move, the control mechanism being responsive to the temperature of the part of the other component that is to be deformed.

Conveniently, when the second component is a brake, the brake element presents at least one friction surface, and the second component presents at least one co-operating surface, the friction surface and the co-operating surface lying immediately adjacent each other during a predetermined movement of the second component relative to the first component in a direction parallel with the friction surface, the force limiter arrangement incorporating a force applying mechanism to apply a normal force ($F_f$) to urge the surfaces against each other, thus creating a friction force ($F_N$) between the first and the second components parallel with the movement, the control mechanism including a calculator to provide a value representing the desired friction effect ($F_{fd}$) to achieve a desired movement-resisting effect to resist relative movement of the components, the control mechanism being associated with an arrangement to provide the signal relating to a parameter which effects the coefficient friction between the brake element and the co-operating surface, the force applying mechanism being controlled in response to the desired friction force value ($F_{fd}$) and the value representing the parameter.

Thus, according to a second aspect of this invention there is provided an energy-absorbing force limiter arrangement comprising first and second components moveable relative to each other, one the component presenting at least one friction surface, and the other the component presenting at least one co-operating surface, the friction surface and the co-operating surface lying immediately adjacent each other during a predetermined movement of one component relative to the other component in a direction parallel with the friction surface, the force limiter arrangement incorporating a force applying mechanism to apply a normal force ($F_N$) to urge the surfaces against each other, thus creating a friction force ($F_f$) between the first and second components parallel with the movement, there being an arrangement to provide a value representing the desired friction force ($F_{fd}$) to achieve a desired movement-resisting effect to resist relative movement of the components and an arrangement to provide at least one signal representative of at least one parameter which affects the coefficient of friction between the friction surface and the co-operating surface, the force applying mechanism being controlled in response to the desired friction force value ($F_{fd}$) and the value representing the parameter.

In one embodiment the arrangement to provide at least one value representing a the parameter is an arrangement to provide a value representative of the relative speed between the first and second components in a direction parallel with the surface.

Conveniently the arrangement to provide at least one value representing a parameter provides a value representative of the temperature of at least one of the two components.

In one specific embodiment the arrangement further includes an arrangement to measure the normal force applied to urge the surfaces against each other, there being a feedback loop to control the force applying mechanism so that the force applying mechanism so that the force applying mechanism applies a normal force ($F_N$) which is substantially equated to the desired normal force ($F_{Nd}$) necessary to provide the desired friction force ($F_{fd}$).

In an alternative embodiment the force limiter arrangement includes a control arrangement to control the force applying mechanism in response to the difference between the calculated desired normal force ($F_{Nd}$) and the applied normal force ($F_N$).

Conveniently the desired normal force ($F_{Nd}$) is calculated from the desired friction force ($F_{fd}$).

In a further embodiment the force applying mechanism is controlled in response to the difference between the desired friction force ($F_{fd}$), and the actual friction force ($F_f$) as calculated from the applied normal force ($F_N$).

The force limiter arrangement may be for a vehicle safety system.

Preferably the force limiter is incorporated in a seat-belt arrangement.

In one embodiment one component is a seat-belt.

In another embodiment one of the components is part of the spool of a seat-belt retractor.

Preferably the desired friction force ($F_{fd}$) is determined in dependence upon the desired belt force ($F_{bd}$).

Conveniently a calculator is provided to calculate the desired friction force ($F_{fd}$) from a plurality of sensed parameters.

Advantageously the parameters include two or more of the occupant weight, the occupant position, crash violence and the impact of a seat occupant with an inflating air-bag.

The force applying mechanism may be piezo-electric stack, or the force applying mechanism may be hydraulic piston arrangement.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

The invention will initially be described primarily with reference to an example which incorporates a vehicle seat-belt, but it is to be appreciated that a force limiter arrangement in accordance with the invention could find other applications, especially in the field of vehicle safety.

In embodiments of the invention, that will be described, an arrangement is provided to determine the desired movement-resisting effect that is to be provided by a seat-belt in an accident situation to limit movement of a seat occupant and to absorb energy. The desired movement-resisting effect, as will become clear from the following description, may be calculated and determined from one or more parameters such as the weight of the seat occupant, the position of the seat occupant relative to the dashboard or steering-wheel of the vehicle, and may also be dependent on the severity of the accident, which may relate to the speed of the vehicle involved in the accident, or the relative speed between the vehicle involved in the accident and the other vehicle or object involved in the accident. Also, the desired movement-resisting effect may be changed during the course of an accident, with the desired effect, for example, being reduced at the instant when the seat occupant impacts with an inflating air-bag.

In some embodiments of the invention a force limiting or braking arrangement is provided to apply a brake element directly to the seat-belt or to a retractor spool on which the seat-belt is wound, the brake element being applied with a force which is such that a frictional effect is provided which resists movement of the safety belt in the desired manner, to provide the desired movement-resisting effect. At least one sensor is provided to sense at least one parameter which causes changes in the coefficient to friction of the co-operating elements that provide the frictional effect so that the effective coefficient of friction may be estimated, and consequently so that the brake element may be applied to the retractor spool or the seat-belt with a sufficient force, taking into account the determined coefficient to friction, for the desired force movement-resisting effect to be provided by the seat-belt. There is no slow control "loop", and thus the desired movement-resisting effect can be applied rapidly.

Figure 1:
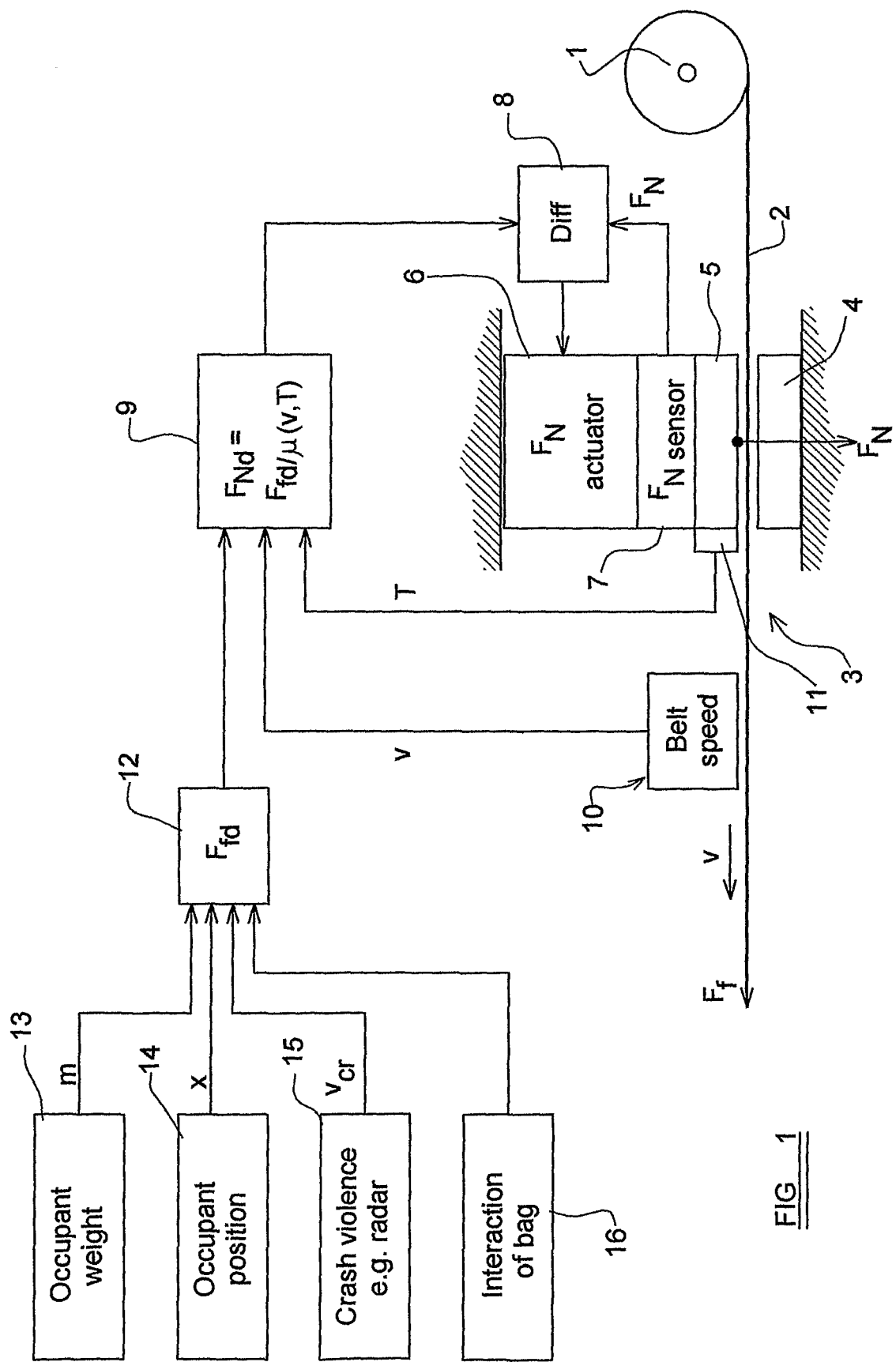
FIG. 1 is a schematic block diagram illustrating one embodiment of the invention.

Referring initially to FIG. 1 of the accompanying drawings, a retractor spool 1 is shown, the retractor spool having a seat-belt 2 wound on it. The seat-belt 2 is shown passing through a braking arrangement 3. The braking arrangement incorporates a fixed block 4 provided on one side of the seat-belt and a moveable brake element 5 mounted on the other side of the seat-belt. The brake element 5 may be moved towards the fixed block 4 by means of an actuator 6, thus trapping part of the seat-belt 2 between a friction surface present on the brake element 5 and the fixed block 4. The actuator 6 may be, for example, an adjustable central element formed from a stack of piezo-electric elements, but other types of actuator may be used. The actuator is designed to generate a normal force $F_N$ which is to be applied, by the brake element 5, to the seat-belt 2. In the illustrated embodiment a force sensor 7 is provided mounted between the actuator 6 and the brake element 5 in order to sense the force $F_N$ actually applied by the actuator to the element 5.

The output of the force sensor 7, which is representative of $F_N$, the applied normal force, is connected to one input of a differential amplifier 8. The other input to the differential amplifier 8 is connected to a control unit 9 which will be described below, and the output of the differential amplifier 8 is provided, as a control signal, to the actuator 6.

The control unit 9 is a control mechanism which is to generate a control signal to be provided to the differential amplifier 8, the control signal being representative of $F_{Nd}$, that is to say the desired normal force, which is to be applied to the seat-belt 2. As has been mentioned above, the desired normal force, $F_{Nd}$ is calculated from a number of parameters to provide a situation in which the desired movement-resisting effect is achieved. Thus the control unit 9 is associated with a belt speed sensor 10, which may be an optical sensor, which senses the speed of movement of the seat-belt 2. The sensor 10 is shown adjacent part of the seat-belt, but the sensor could, for example, determine the speed of rotation of the retractor spool 1, since the speed of rotation of the spool 1 is closely related to the actual speed of the seat-belt 2. The control unit 9 is also associated with a temperature sensor 11, the temperature sensor 11 being mounted to sense the temperature of the brake element 5.

The control unit 9 is also associated with a calculator 12 which calculates the desired friction force $F_{fd}$. The desired friction force is, a measure of the movement-resisting effect that is required. With a high desired friction force $F_{fd}$ only a very small movement will be permitted providing a large movement-resisting effect whereas with a low desired friction force $F_{fd}$ there will be a lesser resistance to movement and thus a greater movement will be permitted.

The calculator 12 may calculate the desired friction force $F_{fd}$ in response to a number of different input signals from further sensors. In the illustrated embodiment a sensor 13 is provided to sense the weight of the occupant and to provide an input signal m to the calculator 12. A further sensor 14 is provided to sense the relative position of the occupant, with regard to the dashboard or steering-wheel of the vehicle. Thus the sensor 14 will provide a specific signal if the occupant is leaning forwardly. The occupant position sensor 14 provides a signal X to the calculator 12.

A further sensor 15 is provided to generate a signal $v_{cr}$ which is applied to the calculator 12, the signal $v_{cr}$ being representative in some way of the violence of a particular crash. The sensor 15 may therefore be, for example, a doppler radar which is utilised to determine the relative velocities between the vehicle in which the described force limiter is mounted and an object with which the vehicle is about to impact.

A further sensor 16 is provided to sense interaction between the vehicle occupant and an inflating air-bag. The interaction sensor may thus be a sensor configured to sense a sudden rise in pressure within an air-bag caused by a seat occupant impacting with the air-bag.

Whilst, in the foregoing paragraphs, various specific examples of appropriate sensors 13 to 16 have been outlined, it is to be appreciated that many different types of sensor may be utilised for performing each of the functions described and, in any event, the described sensors are only examples of sensors which may be used to provide inputs to the calculator 12 which is to calculate the desired frictional force $F_{fd}$.

It is to be appreciated that there is a coefficient of friction $\mu$ between the brake element 5 and the seat-belt 2. This coefficient friction is dependent upon the speed of the belt, as sensed by the sensor 10 and also, in the described embodiment, upon the temperature of the brake element 5, as sensed by the sensor 11.

It is to be appreciated that it would be possible to be able to effect a comparison between the actual force applied to the belt ($F_f$) by the braking element 5, $F_f$, with a calculated desired force $F_{fd}$. Such a comparison could form part of a control loop, but such a control loop would be rather slow in operation and also some sort of sensor would be required to determine the actual force $F_f$ applied to the belt.

Consequently it has been thought that it would be appropriate to measure the normal force $F_n$ applied to the belt, and from this an estimate of the actual frictional force, $F_f$, could be calculated according to the formula:

$$F_f = \mu \cdot F_N$$

Figure 2:
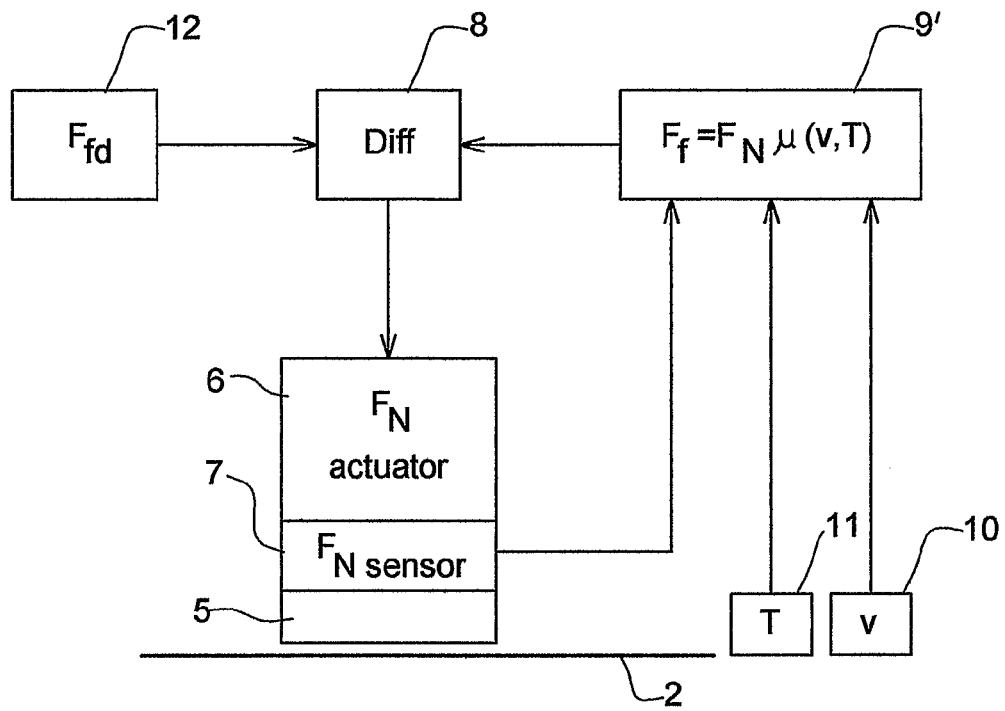
FIG. 2 is a block diagram corresponding in part to FIG. 1 illustrating a modified embodiment of the invention.

The estimate $F_f$ could then be compared with $F_{fd}$ (as shown in FIG. 2). Such a control arrangement would be quicker than a control loop but it is to be understood that $\mu$ is not constant but varies with parameters such as, as shown in the described embodiment, belt speed and temperature.

Now returning to FIG. 1, where instead $F_{Nd}$ is compared with $F_N$, in the control unit 9, $F_{Nd}$ is determined by dividing the desired friction force $F_{fd}$ by a value for $\mu$ which is determined in response to the measured belt speed v and the measured temperature T. Thus $F_{Nd} = F_{fd}/\mu(v,T)$.

In an accident situation, the calculator 12 is provided with signals from the sensors 13 to 16 which indicate the weight of the occupant, the position of the occupant and the expected crash violence, and which also indicate when the seat occupant begins to interact with the air-bag.

Before the occupant begins to interact with the air-bag, the calculator 12 generates an output of the desired friction force $F_{fd}$, which represents the desired magnitude of the movement-resisting effect, which is dependent upon the occupant, weight of the occupant, the position and the crash violence. Subsequent to the occupant beginning to engage with the inflating air-bag, the desired friction force $F_{fd}$ is altered to take into account the interaction between the occupant and the air-bag.

The desired friction force signal $F_{fd}$ may thus have a relatively high value in the opening instants of an accident, and that value may fall, during the later instants of the accident, when the seat occupant begins to engage with the inflating air-bag.

During the accident situation the seat-belt will be withdrawn from the retractor as the seat occupant begins to move forwardly relative to the vehicle. The speed of movement of the belt is measured by the belt speed sensor 10, and an appropriate signal is forwarded to the control unit 9. The belt moves, in the region of the brake element 5, parallel to the friction surface of the brake element 5. As will become clear, during the accident situation, the brake element 5 is pressed firmly into engagement with the upper surface of the moving seat-belt 2, thus trapping the moving seat-belt between the brake element 5 and the fixed block 4. The brake element 5 will tend to resist the movement of the seat-belt, absorbing energy, by friction, which causes the temperature of the brake element 5 to rise. This will alter the coefficient of friction between the brake element 5 and the seat-belt 2. The temperature of the brake element is sensed by the sensor 11 and an appropriate signal is forwarded to the control unit 9. The control unit 9, throughout the accident situation initially calculates, from the sensed temperature and the sensed belt speed, the instantaneous value of $\mu$, the coefficient of friction between the brake element 5 and the moving seat-belt 2. Using the instantaneous value of $\mu$, the instantaneous desired value of the normal force $F_{Nd}$ is calculated, by processing the instantaneous desired friction force value $F_{fd}$ and the coefficient of friction value $\mu$. The instantaneous desired normal force value $F_{Nd}$ is provided to the differential amplifier, and the output of the differential amplifier 8 is connected to the actuator 6 to increase the force provided by the actuator 6 until the force sensed by the sensor 7 is directly equal to the instantaneous value of the desired normal force $F_{Nd}$.

It is to be understood that if, during the accident situation, the instantaneous value of the desired normal force $F_{Nd}$ should rise or fall, the effect of the differential amplifier 8 and the sensor 7 is to ensure that the actuator 6 is always provided with an appropriate control signal to bring the actual applied force $F_N$ into alignment with the instantaneous value of the desired normal force $F_{Nd}$.

Thus, the effect of the differential amplifier 8 is to control the actuator 6 in response to the difference between $F_{Nd}$, the desired normal force as generated by the control unit 9, and the actual applied force $F_N$ as measured by the sensor 7.

It is to be understood that in the described embodiment both belt speed and temperature are sensed. It is envisaged, however, that in some circumstances the degree of variation of the coefficient of friction as a consequence of a rise in temperature of the brake element 5 may be minimal, and consequently just a belt speed sensor 10 may be appropriate. In an alternative arrangement the temperature of the brake element 5 may be calculated from ambient temperature and absorbed power (v·$F_f$) as a function of time.

Turning now to FIG. 2 of the accompanying drawings, in a modified embodiment of the invention a modified control unit 9' may be utilised, the inter-connections between the control unit and the remaining components of the arrangement also being modified.

In the embodiment of FIG. 2, there is again an actuator 6, preferably in the form of a piezo-electric stack, which is provided to bias a brake element 5 into contact with a seat-belt 2, there being a force sensor 7 between the actuator 6 and a friction surface of the brake element 5. Again a seat-belt speed detector 10 is provided together with a temperature sensor 11 to sense the temperature of the brake element 5. The output of the sensor 7, which senses the applied normal force $F_N$ is connected to the control unit 9', and the control unit 9' receives signals also from the belt speed sensor 10 and the temperature sensor 11. The control unit 9' calculates the applied frictional force $F_f$ as a function of $F_N$, as sensed by the sensor 7 and a calculated value for $\mu$ which is dependent upon belt speed and temperature as sensed by the sensors 10 and 11.

Thus: $F_f = F_N \cdot \mu(v, T)$.

The output of the control unit 9' is provided directly as one input of the differential amplifier 8, the other input of the differential amplifier 8 coming from the calculator 12 which calculates the desired frictional force $F_{fd}$. The effect of the differential amplifier 8 is to ensure that the force $F_N$ applied by the actuator 6 is adjusted to such a condition that the calculated frictional force $F_f$ is equal to the desired frictional force $F_{fd}$.

Thus, in this embodiment of the invention, the actuator is controlled in response to the difference between $F_{fd}$, the desired frictional force and $F_f$, the frictional force applied to the belt, which, in this case, is calculated from $F_N$, the normal force which is applied to drive the brake element 5 into contact with the belt.

Figure 3:
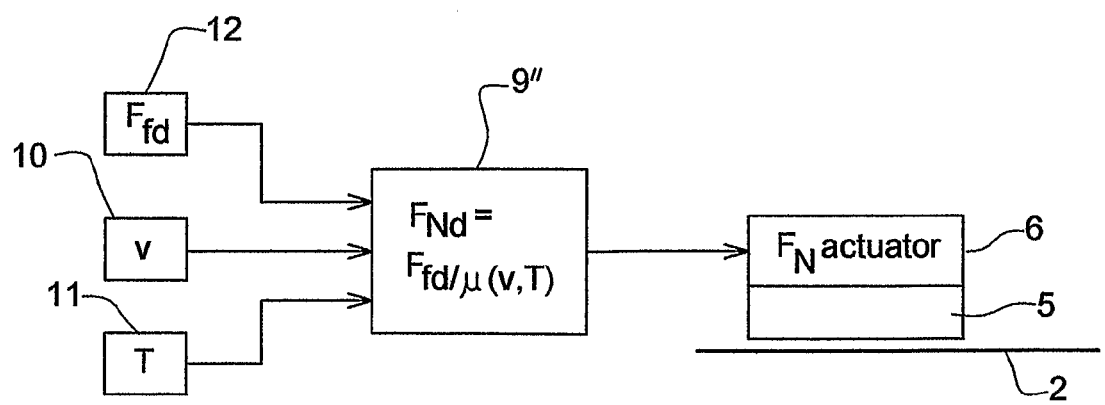
FIG. 3 is a modified block diagram corresponding, in part, to FIG. 1 illustrating a further embodiment of the invention.

FIG. 3 illustrates yet another modified embodiment of the invention. In the embodiment of FIG. 3 a control unit 9" is provided which is connected to directly control an actuator 6, the actuator 6 acting directly upon a brake element 5 to urge a friction surface of the brake element 5 into contact with a seat-belt 2. The control unit 9" receives a first input signal from the calculator 12, which calculates the desired frictional force $F_{fd}$. The control unit 9" also receives an input signal from a belt speed sensor 10 and a temperature sensor 11 which senses the temperature of the brake element 5. It is to be understood that in this embodiment of the invention the normal force $F_N$ applied by the actuator 6 to the brake element 5 is not actually measured, but the actuator is controlled in response to the generated signal $F_{Nd}$, the desired normal force signal, this signal being calculated by dividing the desired frictional force signal $F_{fd}$ by the instantaneous value of $\mu$ as calculated in dependence upon the sensed belt speed and temperature.

Thus: $F_{Nd} = F_{fd}/\mu(v, T)$.

The arrangement of FIG. 3 does therefore not include any feedback loop but instead provides direct control.

In the embodiments of the invention described with reference to FIGS. 1 to 3, a brake element 5 is provided which has a friction surface which acts directly on a moving seat-belt. It is to be appreciated, of course, that a frictional effect may be applied to a seat-belt using other techniques.

Figure 4:
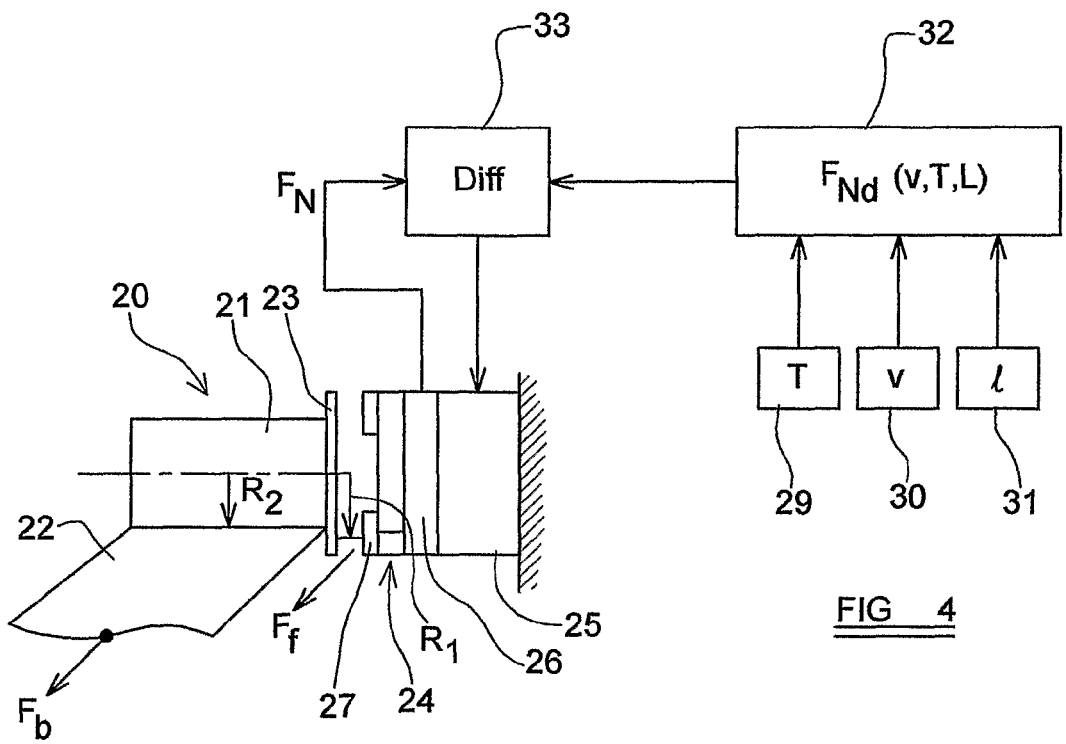
FIG. 4 is a part schematic and part block diagram illustrating a further embodiment of the invention.

Turning now to FIG. 4 of the accompanying drawings part of a retractor spool 20 is illustrated including a spindle 21 on which part of a seat-belt 22 is mounted. The spindle terminates with a flange 23. A braking arrangement 24 is provided located adjacent the flange. The braking arrangement 24 incorporates an actuator 25, which may be a piezo-electric stack of the type discussed above, to act as an adjustable central element, which is associated with an applied force sensor 26, which separates the actuator 25 from a brake support 27. The brake support 27 supports an annular braking element 28. The effective diameter of the brake element 28, $R_1$ is equivalent to the diameter of the flange 23. The effective diameter of the spindle 21 (from the centre of the spindle to the outermost turn of the seat-belt 22) $R_2$ may be considered to increase with an increasing amount of seat-belt on the spool.

In the described embodiment, various sensors are provided to sense, respectively, the temperature of the annular brake element 28, in the form of a temperature sensor 29, the velocity or speed of the seat-belt 22, and a further length sensor 31 to sense the length of seat-belt which has been withdrawn from the spool 20, thus enabling the actual value of $R_2$ to be calculated at any instant. The outputs of the sensors are connected to a control unit 32, which effects adjustment of the adjustable control element embodied by the piezo-electric stack. The control unit 32 generates a control signal $F_{Nd}$, which is the desired normal force to be applied by the actuator 25. This is a function of the speed of the belt, temperature and the length of the belt which has been withdrawn from the retractor, and the desired movement-resisting effect that is to be achieved. The signal from the control unit 32 is fed to a differential amplifier 33, which has a second input connected to the sensor 26 which senses the normal force $F_N$ as applied by the actuator 25. The output of the differential amplifier 33 is connected as a controlling input to the actuator 25.

The energy-absorbing force $F_b$ applied to the belt 22 can be determined by the following equation:

$$F_b R_2 = F_f R_1,$$

where $F_f$ is the frictional force applied by the annular brake element 21 which has the radius $R_1$.

Of course it is to be noted that $R_2$ depends upon the extracted belt length l. Thus:

$$F_f = F_b R_2(l)/R_1;$$

$$F_{Nd} = F_{fd}/\mu = F_{bd} R_2(l)/R_1 \mu(v,T)$$

It is to be understood that in operation of the embodiment illustrated in FIG. 4, in an accident situation, seat-belt 22 is withdrawn from the spindle 21. The spool 20 will thus rotate. The flange 23 will thus rotate, in a plane parallel with the friction surface of the brake element 28. When the actuator 25 is actuated the brake support 27 is moved towards the flange 23 and the friction surface of the brake element 28 is brought into contact with the moving flange, thus applying the desired frictional effect to the flange, retarding withdrawal of the seat-belt 22 and absorbing energy. The frictional effect is controlled, as described above, by the control unit 32.

Figure 5:
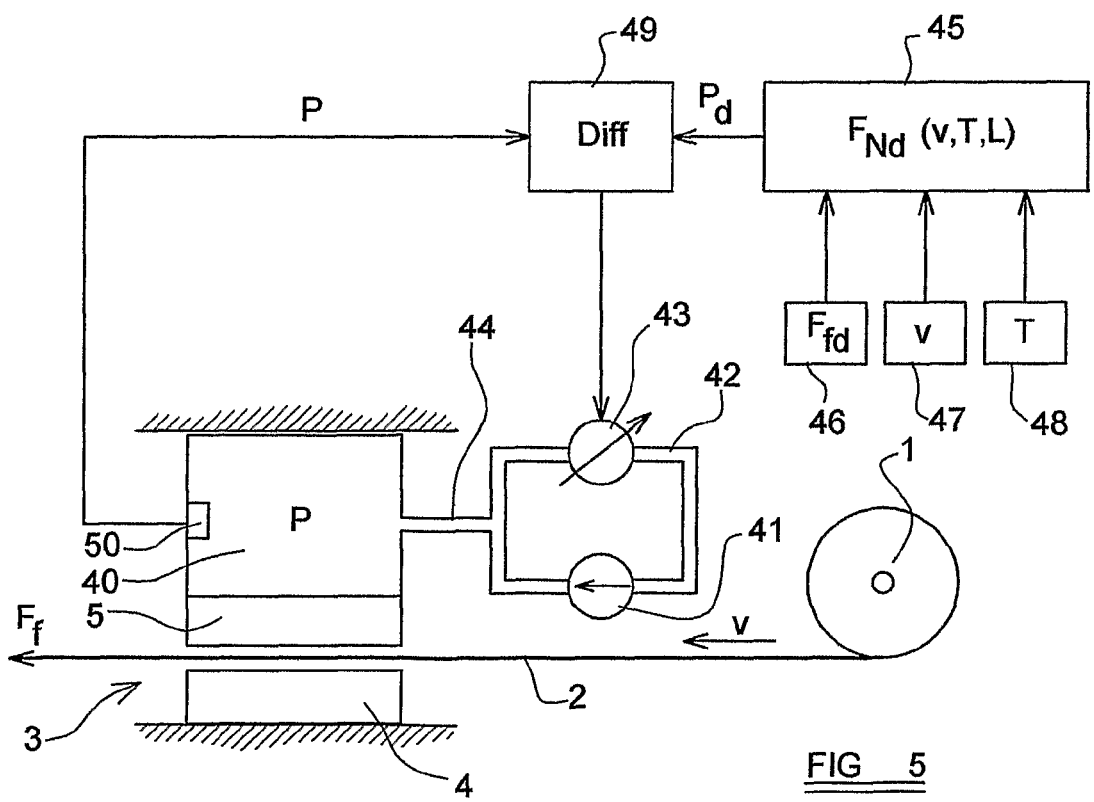
FIG. 5 is a part schematic and part block diagram illustrating a further embodiment of the invention.

FIG. 5 illustrates yet a further embodiment of the invention, and in this embodiment of the invention, instead of an actuator being provided which incorporates a piezo-electric stack, a hydraulic piston arrangement is utilised. In the apparatus of FIG. 5, again a retractor spool 1 is provided on which is wound a seat-belt 2. The seat-belt passes through a braking arrangement 3 which incorporates a fixed block 4 on one side of the seat-belt and a moveable brake element 5 on the other side of the seat-belt. The brake element 5 is associated with a hydraulic actuator 40 in the form of a cylinder to which hydraulic fluid is supplied, the cylinder containing a piston to which the brake element 5 is mounted. The brake element 5 may thus be moved to bring a friction surface of the brake element into contact with the seat-belt 22. A hydraulic pump 41 is provided which is connected to an auto feed-back loop 42 which incorporates a controllable valve 43, part of the feed-back loop 42 being connected, by means of a connection 44, to the hydraulic actuator 40. The valve 43 is an adjustable control element. By controlling the degree of open-ness of the valve 43 the pressure of hydraulic fluid within the actuator 40 may be adjusted, and thus the braking force can be adjusted, enabling the movement-resisting effect to be controlled. A controller 45 is provided, the controller receiving input signals from a calculator 46 (equivalent to the calculator 12 of the previously described embodiments) which calculates a desired frictional force $F_{fd}$, a further sensor 47 which senses belt speed and yet another sensor 48 which senses the temperature of the brake element 5. The calculator 45 is to calculate a desired pressure $P_d$ to be present within the cylinder 40. The desired pressure signal $P_d$ is a function of $F_{fd}$, belt speed and temperature.

The desired pressure $P_d$ signal is forwarded to a differential amplifier 49, the other input to which comes from a pressure sensor 50 which is present within the actuator 40. The output of the differential amplifier 49 controls the adjustable valve 43 in such a way that the pressure within the hydraulic actuator 40 is made to be equal to the desired pressure $P_d$ as calculated by the controller 45.

Figure 6:
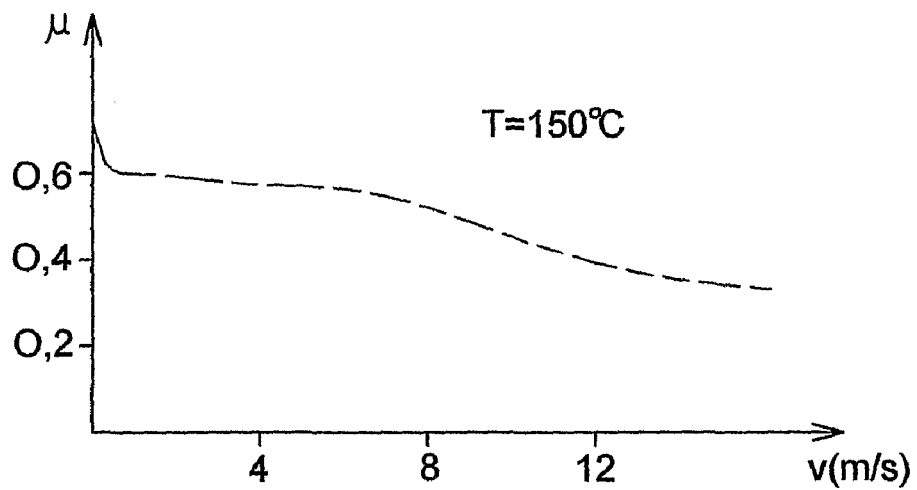
FIG. 6 is a graphical figure provided for purposes of explanation.
Figure 7:
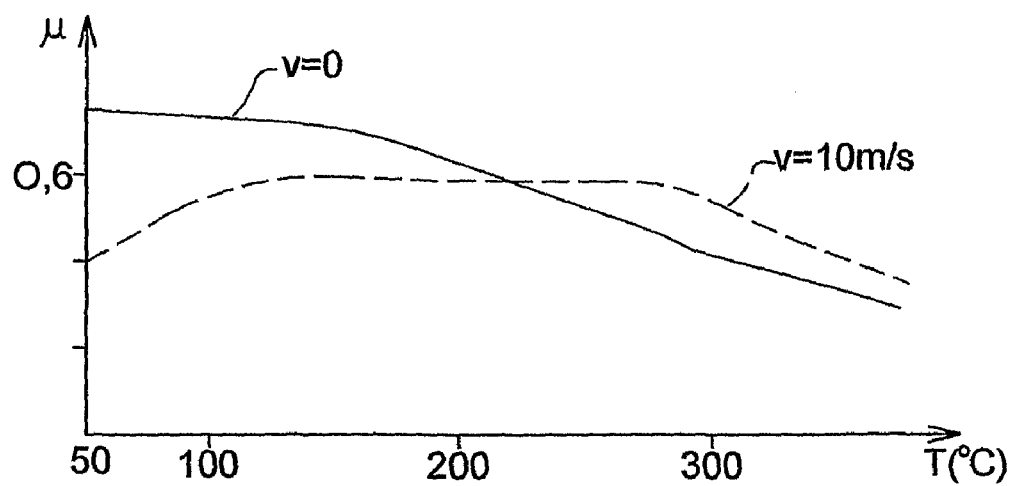
FIG. 7 is a further graphical figure again provided for purposes of explanation.

Merely in order to facilitate an understanding of the invention FIG. 6 is a graphical figure illustrating a typical plot of a change of friction with increasing belt speed. FIG. 7 is a graphical plot illustrating the change of friction with regard to temperature, showing one plot for static friction, when the speed of belt withdrawal is zero, and also showing another plot for a constant rate of belt extraction, where the velocity of belt extraction is 10 metres per second.

Whilst the preceding embodiments all rely on a frictional effect to provide the desired degree of resistance to movement, it is to be understood that alternative arrangements may be provided to resist movement. For example, one type of arrangement which resists movement can rely on plastic deformation of one component of the force limiter, as shown in FIGS. 8 and 9.

Figure 8:
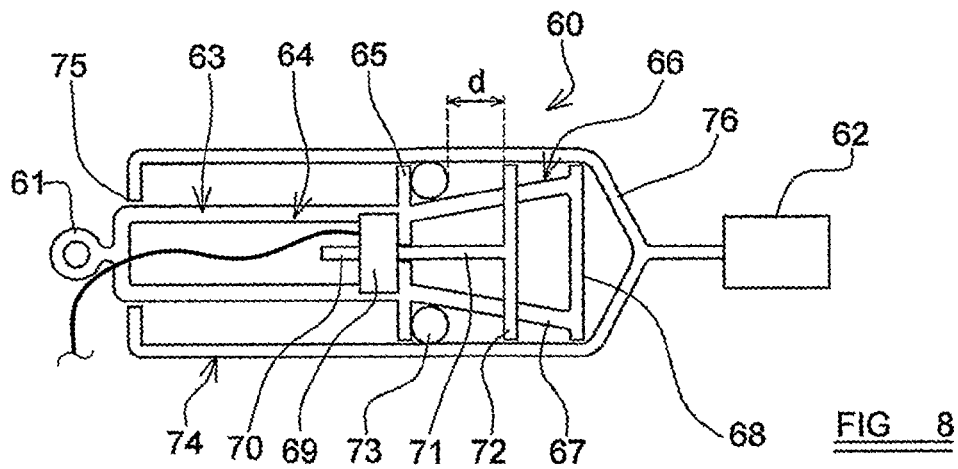
FIG. 8 is a schematic view of an operative part of a further embodiment of the invention.
Figure 9:
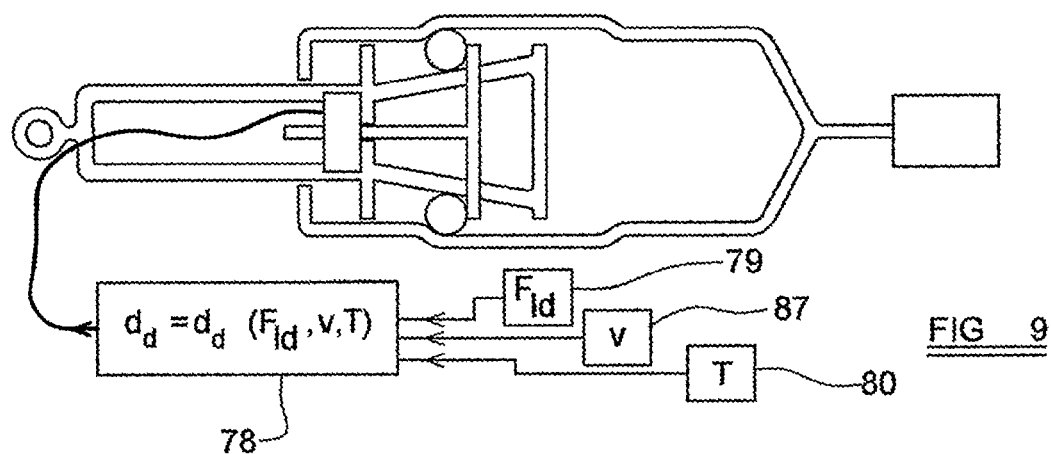
FIG. 9 is schematic view corresponding to FIG. 8 showing the operative part of FIG. 8 in an alternate condition and showing a control arrangement.

FIG. 8 illustrates an energy absorbing arrangement 60, the energy absorbing arrangement 60 having a first anchorage 61 to be connected to part of the structure of a vehicle, and a second anchorage 62 which is to be connected, for example, to a pillar loop for a seat-belt, or which is to be used to be connected to a safety belt buckle. As will be described, the arrangement is such that the length of the arrangement may be increased, with a desired resistance to movement, and with energy being absorbed.

The first anchorage 61 is connected to an elongate plunger element 63. The plunger element 63 has an axially extending stem portion formed from a plurality of generally parallel fingers 64. The fingers 64 carry, at the end remote from the anchorage 61, a radially outwardly directed flange 65. Beyond the flange 65 there is a head portion 66. The head portion comprises a plurality of diverging fingers 67, which carry, at their distal ends, an end plate 68. Only two diametrically opposed fingers 67 are shown in FIG. 8, but there are a plurality of closely adjacent fingers.

Carried by the fingers 64 of the stem 63 adjacent the flange 65 is a drive motor 69. The drive motor 69 is aligned with the axis of the plunger 63, and is surrounded by the ends of the fingers 64. Passing through the drive motor 69 is a threaded rod which extends axially, the threaded rod passing through an aperture formed in the flange 65, and then spreading to form a plurality of diverging fingers 71, only one of which is visible in FIG. 8. The diverging fingers 71 extend between the diverging fingers 67 and carry a ring 72 which passes around the exterior of the fingers 67 of the end plate 68. The ring is of flange-like form. A plurality of balls 73 are provided which are located between the flange-like ring 72 and the flange 65 carried at the head of the flange 65.

The entire plunger 63 as thus described is contained within a generally tubular housing 74 formed of plastically deformable material, such as a "soft" metal. One end of the housing defines an aperture 75, and the fingers 64 of the plunger 63 emerges from the housing through the flange 65, so that the anchorage 61 is accessible. The other end 76 of the housing is connected to the anchorage 62. It is to be noted that the diameter of the flange 65, the ring 72 and the end plate 68 are such that the entire plunger may move within the tubular housing 74. The plunger will be held initially in place by means of a frangible element, not shown.

Should a sufficient force be applied to the anchorage 62 to break the frangible element, the cylindrical housing will tend to move relative to the plunger 63. The balls 73 will be able to move, along the diverging fingers 67 of the head 66 a distance "d" as shown in FIG. 8, until the balls engage the flange-like ring 72. As the balls move along the fingers the balls will be driven radially outwardly relative to the axis of the tubular housing 74, thus commencing a deformation of the side walls of the housing 74. When the balls are in contact with the ring 72, the plunger 63 will still be withdrawn from the housing 74, an as it is withdrawn the balls will effectively move along the housing, deforming the material of the side wall of the housing, and absorbing energy whilst providing a resistance to movement of the anchorage 62 and consequently resisting movement of any seat-belt that is connected to that anchorage.

It is to be appreciated that the degree by which the balls deform the side wall of the housing 74, and thus the magnitude of the resistance to movement, and the magnitude of the energy absorbed, can be adjusted by controlling the position of the ring 72, relative to the head 66 by operating the motor 69. Thus the ring 72 acts as an adjustable control element, as the magnitude of the movement-resisting effect is a function of the specific degree of adjustment, in the axial direction, of the ring 71.

Consequently, by adjusting the position of the ring 72, a desired movement-resisting effect may be achieved. However, the movement-resisting effect is dependent upon the temperature of the material of the housing and is also dependent upon the actual speed of movement of the balls along the axis of the housing.

Consequently, as shown in FIG. 9, a control unit 78 is provided to control the motor 69. The control unit receives an input from a calculator 79 which calculates the desired limiting force ($F_{ld}$) which, of course, is related to the desired movement-limiting effect. Also the control unit 78 is connected to a temperature sensor 80 and a belt speed sensor 81. The motor 69 is controlled to provide a desired degree of movement ($d_d$) for the balls 73 along the ramp or wedge constituted by the diverge flanges 67 of the head 66, which is a function of the desired limiting force ($F_{ld}$) which is a measure of the required movement-resisting effect, the speed (v) between the anchorage 61 and the anchorage 62, and the temperature (T) of the material of the housing.

Figure 10:
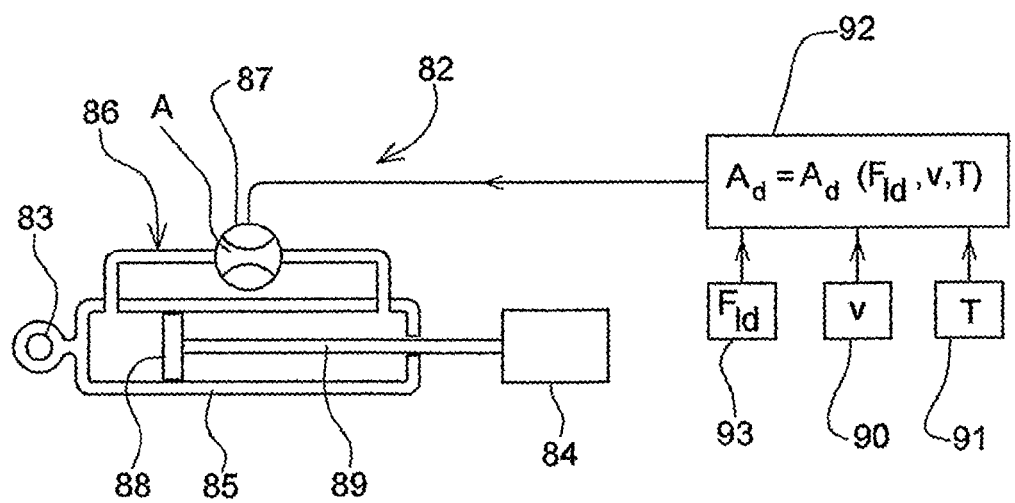
FIG. 10 is a schematic view of yet a further embodiment of the invention.

FIG. 10 illustrates a further embodiment of the invention in which an energy absorbing unit 82 is provided. The energy absorbing unit 82 has a first anchorage 83 to be connected to a motor vehicle a second anchorage 84 which can be connected, for example, to a pillar loop or to a seat belt buckle. The first anchorage is connected to a hydraulic cylinder 85, there being a "bypass" loop 86 connecting the opposed ends of the cylinder, with the bypass loop containing a control valve 87. A piston 88 within the hydraulic cylinder is provided with a piston rod 89 which extends from the cylinder to the second anchorage 84. The second anchorage 84 can move relative to the first anchorage 83, with a flow of hydraulic fluid through the bypass and through the control valve 87. By controlling the effective cross-sectional area of the control valve, the degree of resistance to movement of the second anchorage 84 with reference to the first anchorage 83 can be controlled. The resistance to movement is, however, a function of the speed of movement (v) of the second anchorage 84 relative to the first anchorage 83 and is also related to the temperature of the hydraulic fluid.

Thus, in the embodiment of FIG. 10 a control unit 92 is provided to control the valve 87 to provide a desired flow area ($A_d$) for fluid passing through the valve. The control unit is associated with a calculator 93. The desired area ($A_d$) is a function of the desired limiting force ($F_{ld}$) which is a measure of the desired degree of resistance to movement, and thus the control unit 92 does the calculation which generates a signal representative of this value. The control unit 92 is also provided with an arrangement 90 to provide an input signal representative of the speed of movement of the second anchorage 84 relative to the first anchorage 83 and an arrangement 91 to provide a signal representative of temperature.

Whilst the invention has been described with reference to embodiments in which movement is resisted by a friction effect and by a hydraulic effect, it is to be appreciated that in other embodiments of the invention the resistance to movement may be controlled by an electromagnetic effect, with an electromagnetic control element controlling movement of, for example, a core within a solenoid or controlling the movement of a liquid within a pipe.

While the above description constitutes the preferred embodiment of the present invention, it will be appreciated that the invention is susceptible to modification, variation, and change without departing from the proper scope and fair meaning of the accompanying claims.

The invention claimed is:

1. An energy-absorbing force limiter for a safety device as part of a vehicle seat-belt system comprising a first component and a second component that is moveable relative to the first component, the force limiter including an arrangement that provides an energy-absorbing movement-resisting effect to control movement of the second component relative to the first component, the arrangement including an adjustable control element, for controlling a magnitude of the movement-resisting effect as a function of a current value of at least one parameter, a control mechanism to effect adjustment of the adjustable control element to control the magnitude of the movement-resisting effect representative of a desired resistance to movement together with a signal representative of the parameter, the movement-resisting effect being a friction effect acting on the second component to control movement of the seat-belt of the seat-belt system, the arrangement to control movement of the second component being a brake element, the adjustable control element driving the brake element into engagement with a co-operating surface, the control mechanism being responsive to the signal relating to the parameter in the form of a parameter which affects a coefficient of friction between the brake element and the co-operating surface, and the control mechanism being responsive to the signal in the form of a first signal relating to a speed of movement of the second component relative to the brake element, and of a second signal relating to a temperature of the brake element.

2. The force limiter according to claim 1 wherein the brake element presents at least one friction surface, and the second component presents at least one co-operating surface, the friction surface and the co-operating surface lying immediately adjacent each other during a predetermined movement of the second component relative to the first component in a direction parallel with the friction surface, the force limiter arrangement incorporating a force applying mechanism to apply a normal force ($F_N$) to urge the surfaces against each other, thus creating a friction force ($F_f$) between the first and the second components parallel with the movement, the control mechanism including a calculator to provide a value representing the desired friction force ($F_{fd}$) to achieve a desired movement-resisting effect to resist relative movement of the components, the control mechanism being associated with an arrangement to provide the signal in the form of a signal relating to a parameter which effects the coefficient friction between the brake element and the co-operating surface, the force applying mechanism being controlled in response to the desired friction force value ($F_{fd}$) and the value representing the parameter.

3. The force limiter arrangement according to claim 2 wherein the parameters include two or more of an occupant weight, an occupant position, crash violence, and an impact of a seat occupant with an inflating air-bag.

4. The force limiter according to claim 1 wherein the movement-resisting effect is a hydraulic effect acting on the second component to control a movement of a seat-belt of the seat-belt system.

5. The force limiter according to claim 4 wherein the adjustable control element is a valve that controls a movement of a piston within a cylinder, the second signal relating to the temperature of hydraulic fluid within the cylinder.

6. The force limiter according to claim 1 wherein the movement-resisting effect is a deformation effect acting on the second component to control a movement of a seat-belt of the seat-belt system.

7. The force limiter according to claim 6 wherein one of the first and second components is associated with one or more elements located to deform part of the other component upon movement of the second component relative to the first component, the adjustable control element serving to adjust to a degree of deformation as the components move relative to each other.

8. The force limiter arrangement according to claim 1 wherein the second component is part of a spool of a seat-belt retractor.

9. An energy-absorbing force limiter arrangement for a safety device as part of a vehicle seat-belt system comprising a first and a second component moveable relative to each other, the first component presenting at least one friction surface, and the second component presenting at least one co-operating surface, the friction surface and the co-operating surface lying immediately adjacent each other during a pre-determined movement of the first component relative to the second component in a direction parallel with the friction surface, the force limiter arrangement incorporating a force applying mechanism to apply a normal force ($F_N$) to urge the surfaces against each other, thus creating a friction force ($F_f$) between the first and the second components parallel with the movement, an arrangement to provide a value representing a desired friction force ($F_{fd}$) to achieve a desired movement-resisting effect to resist relative movement and the arrangement providing at least one signal representative of at least one parameter which affects a coefficient of friction between the friction surface and the co-operating surface, the force applying mechanism being controlled in response to the desired friction force value ($F_{fd}$) and a value representing the parameter, the parameter being a temperature of at least one of the first and second components.

10. The force limiter arrangement according to claim 9 wherein the force applying mechanism is further controlled in response to a value representative of a relative speed between the first and second components in a direction parallel with the surfaces.

11. The force limiter arrangement according to claim 9 wherein the force applying mechanism is controlled in response to a difference between the desired friction force ($F_{fd}$), and the friction force ($F_f$) as calculated from the normal force ($F_N$).

12. The force limiter arrangement according to claim 9 wherein the second component is a seat-belt.

13. The force limiter arrangement according to claim 9 wherein one of the second component is part of a spool of a seat-belt retractor.

14. The force limiter arrangement according to claim 9 wherein the force applying mechanism is a piezo-electric stack.

15. The force limiter arrangement according to claim 9 wherein the force applying mechanism is a hydraulic arrangement.

16. An energy-absorbing force limiter arrangement for a safety device as part of a vehicle seat-belt system comprising a first and a second component moveable relative to each other, the first component presenting at least one friction surface, and the second component presenting at least one co-operating surface, the friction surface and the co-operating surface lying immediately adjacent each other during a pre-determined movement of the first component relative to the second component in a direction parallel with the friction surface, the force limiter arrangement incorporating a force applying mechanism to apply a normal force ($F_N$) to urge the surfaces against each other, thus creating a friction force ($F_f$) between the first and the second components parallel with the movement, an arrangement to provide a value representing a desired friction force ($F_{fd}$) to achieve a desired movement-resisting effect to resist relative movement and the arrangement providing at least one signal representative of at least one parameter which affects a coefficient of friction between the friction surface and the co-operating surface, the force applying mechanism being controlled in response to the desired friction force value ($F_{fd}$) and a value representing the parameter, wherein the arrangement further includes a sensor to measure the normal force applied to urge the surfaces against each other, there being a feed-back loop to control the force applying mechanism so that the force applying mechanism applies the normal force ($F_N$) which is substantially equated to a desired normal force ($F_{Nd}$) necessary to provide the desired friction force ($F_{fd}$).

17. The force limiter arrangement according to claim 16 wherein the desired friction force ($F_{fd}$) is determined in dependence upon a desired belt force ($F_{bd}$).

18. The force limiter arrangement according to claim 16 wherein a calculator is provided to calculate the desired friction force ($F_{fd}$) from a plurality of sensed parameters.

19. The force limiter arrangement according to claim 18 wherein the parameters include two or more of an occupant weight, an occupant position, crash violence, and an impact of a seat occupant with an inflating air-bag.

20. An energy-absorbing force limiter arrangement for a safety device as part of a vehicle seat-belt system comprising a first and a second component moveable relative to each other, the first component presenting at least one friction surface, and the second component presenting at least one co-operating surface, the friction surface and the co-operating surface lying immediately adjacent each other during a pre-determined movement of the first component relative to the second component in a direction parallel with the friction surface, the force limiter arrangement incorporating a force applying mechanism to apply a normal force ($F_N$) to urge the surfaces against each other, thus creating a friction force ($F_f$) between the first and the second components parallel with the movement, an arrangement to provide a value representing a desired friction force ($F_{fd}$) to achieve a desired movement-resisting effect to resist relative movement and the arrangement providing at least one signal representative of at least one parameter which affects a coefficient of friction between the friction surface and the co-operating surface, the force applying mechanism being controlled in response to the desired friction force ($F_{fd}$) and a value representing the parameter and further in response to a difference between a calculated desired normal force ($F_{Nd}$) and the normal force ($F_N$), wherein the desired normal force ($F_{Nd}$) is calculated from the desired friction force ($F_{fd}$).

* * * * *